United States Patent [19]

Ando et al.

[11] Patent Number: 4,668,646
[45] Date of Patent: May 26, 1987

[54] ALUMINA CERAMIC COMPOSITION

[75] Inventors: Minato Ando, Aichi; Masaaki Ito; Fumio Mizuno, both of Nagoya, all of Japan

[73] Assignee: NGK Spark Plug Co., Ltd., Aichi, Japan

[21] Appl. No.: 900,512

[22] Filed: Aug. 26, 1986

[30] Foreign Application Priority Data

Aug. 28, 1985 [JP] Japan .................. 60-189054

[51] Int. Cl.$^4$ .............. C04B 35/10; C04B 35/46
[52] U.S. Cl. ..................... 501/136; 501/152; 501/153
[58] Field of Search .............. 501/136, 152, 153

[56] References Cited

U.S. PATENT DOCUMENTS 4,591,574 5/1986 Ando et al. ............... 501/136

Primary Examiner—Mark L. Bell
Attorney, Agent, or Firm—Wegner & Bretschneider

[57] ABSTRACT

An alumina ceramic composition to provide a low dielectric loss in the high frequency region upon sintering, which consists essentially of: 100 parts by weight of a base composition containing therein $Al_2O_3$, CaO and $TiO_2$ within their respective compositional range; and 0.03 to 3 parts by weight of $La_2O_3$. The base composition is within a range A-B-C-D-E-A in the ternary diagram (Figure) in molar fraction:

|   | $Al_2O_3$ | CaO | $TiO_2$ |
|---|---|---|---|
| A | 99.0 | 0.5 | 0.5 |
| B | 94.5 | 3.7 | 1.8 |
| C | 90.0 | 7.0 | 3.0 |
| D | 90.0 | 2.0 | 8.0 |
| E | 94.5 | 1.3 | 4.2 |

4 Claims, 1 Drawing Figure

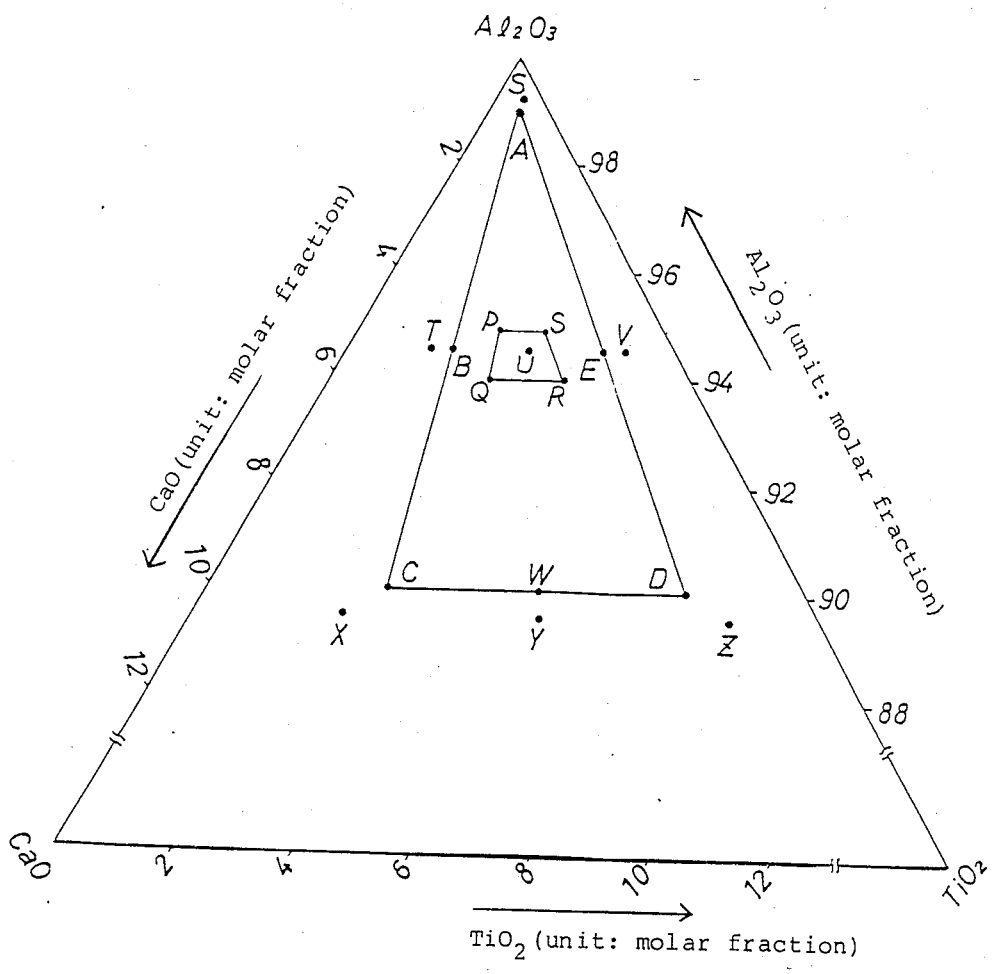

4,668,646

ALUMINA CERAMIC COMPOSITION

BACKGROUND OF THE INVENTION (a) Field of the Invention

This invention relates to a ceramic composition, and, more particularly, it is concerned with an alumina ceramic composition having a low dielectric loss in the high frequency region, and being useful as those component parts for the telecommunication apparatuses and appliances such as a dielectric resonator, a substrate for micro-wave integrated circuits, micro-wave transmission window, dielectric members for antenna, and so forth.

(b) Background of the Invention

With development in the telecommunication networks in recent years, practical range of microwave frequency to be used has extended to the high frequency region. In conjunction with this, the dielectric ceramics find their uses in the dielectric resonators, the substrate for the microwave integrated circuits, impedance matching of various kinds of microwave circuits, and so forth to be used in the high frequency region. The dielectric ceramic material of this kind is desired to have its dielectric constant (E) of 10 or so, and its dielectric power factor (than δ) of as small a value as possible (for example, $\tan \delta \leq 7 \times 10^{-5}$) and the absolute value of its temperature factor (Tf) for the resonance frequency of as small a value as possible (for example, $|Tf| \leq 30$ ppm/°C.). On the other hand, since the alumina ceramic has the dielectric constant (E) of 10 or so and a small value of the dielectric power factor (tan δ), and yet the material is available abundantly in its resources, it is highly expected for use as the abovementioned dielectric ceramic material. On the other hand, however, it takes a large absolute value of its temperature factor (Tf) for the resonance frequency of about −60 ppm/°C., the ceramic material has not yet attained its practical usefulness.

In order to solve this problem, there has been proposed a dielectric ceramic composition for the substrate as disclosed in Japanese Laid-Open Patent Application No. 53-149696, which contains therein MgO, TiO₂ and CaO added to alumina at their predetermined ratios. There has also been proposed by the present inventors in Japanese Patent Application No. 59-32113 an alumina ceramic composition composed of Al₂O₃, CaO and TiO₂ at their given ratios, for the same purpose as mentioned above.

However, these prior patent applications as above referred to are unable to provide the dielectric resonators having sufficient precision in a higher frequency region of 8 GHz or above, hence they are required to be further improved of their dielectric loss in the high frequency region.

SUMMARY OF THE INVENTION

It is therefore an object of the present invention to provide an alumina ceramic composition having a low dielectric loss in the high frequency region and therefore being useful as various component parts for those telecommunication apparatuses and appliances.

According to the present invention in general aspect thereof, there is provided an alumina ceramic composition, which consists essentially of: 100 parts by weight of a base composition containing therein Al₂O₃, CaO and TiO₂ within their respective ranges as enclosed by rectilinear lines connecting points A-B-C-D-E-A, each having the following values in a ternary triangular coordinate system as shown in the accompanying drawing, wherein Al₂O₃, CaO and TiO₂ are represented by three parameters in the molar fractions on the three coordinates; and 0.03 to 3 parts by weight of La₂O₃,

|   | Al₂O₃ | CaO | TiO₂ |
|---|-------|-----|------|
| A | 99.0  | 0.5 | 0.5  |
| B | 94.5  | 3.7 | 1.8  |
| C | 90.0  | 7.0 | 3.0  |
| D | 90.0  | 2.0 | 8.0  |
| E | 94.5  | 1.3 | 4.2  |

(unit: molar fraction).

The foregoing object, other objects as well as specific compositional ratio and manner of producing the alumina ceramic composition according to the present invention will become more apparent from the following detailed description thereof in reference to preferred embodiments thereof, when read in conjunction with the accompanying drawing.

BRIEF DESCRIPTION OF THE ACCOMPANYING DRAWING

In the drawing, the single FIGURE is a ternary diagram showing a base composition of Al₂O₃, CaO and TiO₂ in the alumina ceramic composition according to the present invention.

DETAILED DESCRIPTION OF PREFERRED EMBODIMENT

In the following, the present invention will be described in detail with reference to preferred embodiments thereof.

As described above, the quantity of lanthanum trioxide (La₂O₃) to be present in the alumina ceramic composition according to the present invention is determined in a range of from 0.03 to 3 parts by weight (preferably, 0.1 to 1.0 parts by weight). The reason for this numerical range is that, when its quantity is less than 0.03 part by weight, no improvement can be seen in the high frequency dielectric loss thereof; on the contrary, when its quantity exceeds 3 parts by weight, the dielectric loss in the high frequency region becomes rather deteriorated, or the temperature factor for the resonance frequency becomes too low with the consequence that its absolute value becomes too high. Also, in the above-described composition of Al₂O₃—CaO—TiO₂, when the Al₂O₃ content becomes higher than the above-described compositional range, the temperature factor for the resonance frequency becomes too low; on the contrary, when the Al₂O₃ content becomes lower than the above-described compositional range, the temperature factor for the resonance frequency increases considerably, in either case resulting in that the absolute value of the temperature factor for the resonance frequency becomes very large. Further, in the above-described Al₂O₃—CaO—TiO₂ composition, when the CaO content becomes higher (i.e., the TiO₂ content becomes lower), or the CaO content becomes lower (i.e., the TiO₂ content becomes higher), the high frequency dielectric loss increases in either case.

To make the present invention more effective, it is preferred that the proportion of the aforesaid three components be, in the ternary diagram as shown in FIGURE within the following range defined by P-Q-R-S-P (referred to as the P-S range):

|   | $Al_2O_3$ | CaO | $TiO_2$ |
|---|---|---|---|
| P | 94.9 | 2.8 | 2.3 |
| Q | 94.0 | 3.4 | 2.6 |
| R | 94.0 | 2.2 | 3.8 |
| S | 94.9 | 2.1 | 3.0 |

(by molar fraction).

The P-S range provides a further improvement in the high frequency dielectric loss.

On the basis of the base composition of $Al_2O_3$—CaO—$TiO_2$ hereinabove mentioned, the present invention contemplated to further decrease, to a remarkable extent, the high frequency dielectric loss in the alumina ceramic composition by addition of $La_2O_3$ to the ternary base composition of $Al_2O_3$—CaO—$TiO_2$.

The improvement in the high frequency dielectric loss by the addition $La_2O_3$ has yet to be clarified. However, there appears to be a relationship between the addition of $La_2O_3$ and the improvement in the high frequency dielectric loss in that, according to the present invention, the added $La_2O_3$ would function to suppress abnormal (excessive) grain growth in alumina at the time of its sintering to thereby result in production of a dense sintered alumina ceramic product with a uniform crystal grain size and less voids being present therein.

By the addition $La_2O_3$ to the $Al_2O_3$—CaO—$TiO_2$ ternary base composition the present invention could attain sufficiently low dielectric loss in the high frequency region of 8 GHz or above. On account of this, when the sintered product based on the alumina ceramic composition of the present invention is used as the dielectric resonator, there can be realized the dielectric resonator of high precision, which maintains its stability even in the high frequency region of 8 GHz or above.

Generally speaking, the inventive composition provides, upon sintering, a dielectric power factor (tan δ) of $7.0 \times 10^{-5}$ or less (preferably $6.0 \times 10^{-5}$ or less) and a temperature factor ($|Tf|$) for the resonance frequency of 30 ppm/°C. or less (preferably 20 ppm/°C. or less). Generally speaking the sintering may be done 1360°–1460° C., preferably 1380°–1440° C.

Moreover, owing to the added $La_2O_3$, the alumina ceramic composition according to the present invention is able to produce a dense ceramic article (generally, a relative density of 98.5% or more (preferably 99.0% or more) versus the theortical density) with a uniform crystal grain size and with less voids being present therein, so that it can be used for those component parts required of air-tightness, without necessity for any special processing. The average alumina grain size in the sitered product can be 4 μm or below, preferably 3 μm or below.

With a view to enabling those persons skilled in the art to put the present invention into practice, the following preferred example is presented.

EXAMPLE

Alumina ($Al_2O_3$) ("AKP-HP"—a product of Sumitomo Kagaku Kogyo K.K., Japan, having a purity of 99.995%), titanium dioxide ($TiO_2$) (special grade reagent containing 95% or more of rutile type titanium), and calcium carbonate ($CaCO_3$) (special grade reagent) were blended in various compositional ratios as shown in Table 1 below, in terms of the oxide conversion, the total quantity of each mixture being made 500 g. To 100 parts by weight of each of these mixtures, lanthanum oxide ($La_2O_3$) (special grade reagent) was added at a rate as shown in Table 1 with further addition of 400 ml of pure water and 10 g of polyvinyl alcohol (organic binder). Each of the mixtures was then placed in a ball mill made of polyethylene and having an inner volume of 3 l, together with 1.5 kg of alumina ceramic balls, each having 20 mm in diameter and a purity of 99.9%; the mixture was then subjected to wet-mixing for 50 hours by this ball mill at a rotational speed of 84 r.p.m., thereby obtaining slurry. The thus obtained slurry was freezedried for 15 hours, caused to pass through a 42-mesh sieve, and pressed in a shaping metal mold having 18.3 mm in diameter and 10.0 mm in thickness under a pressure of 1,500 kg/cm². Then, this shaped product was sintered in an oxydizing atmosphere at each temperature level as shown in Table 1, followed by polishing the same to a finished surface roughness of 0.3S. The finished product was thereafter washed with acetone and then with water under ultrasonic vibration, after which it was dried. As the result, there were obtained test specimens, each having a size of 15 mm in diameter and 8 mm in thickness. These test specimens were measured under the following conditions for their temperature factor (Tf) for resonance frequency, dielectric power factor (tan δ) and dielectric constant (E). The results of the measurements are shown in Table 1 below.

| Conditions for Measurement | |
|---|---|
| Method of measurement: | dielectric column resonator method |
| Apparatus used: | 8408B Network Analyzer System (product of Yokogawa-Hewlett Packard Co. Ltd.) |
| Frequency used: | 8 GHz |

For the sake of ready reference, Table 1 below also indicates composition of each test specimen.

Also, in the accompanying FIGURE, the point A indicates the composition of the specimens No. A-1 to No. A-7, and the points B to E and S to Z indicate the composition of each test specimen No. B-1 to B-7, C-1 to C-7, and so on.

As is apparent from Table 1, in order that the dielectric power factor (tan δ) and the temperature factor (Tf) for the resonance frequency may be in their practical ranges (i.e., tan $\delta \leq 7 \times 10^{-5}$ and $|Tf| \leq 30$), the contents of $Al_2O_3$, CaO, $TiO_2$ and $La_2O_3$ should be within the range as established by the present invention. The average alumina grain size in the specimens within the range of the present invention was about 4 μm or below. The density of the sintered product relative to the theoretical density was about 98.5% or higher for the specimens within the inventive range.

Although, in the foregoing, the present invention has been described in detail with particular reference to the preferred example thereof, it should be noted that the invention is not limited to this example alone, but various changes and modifications may be made by those persons skilled in the art to the compositional ranges, processing parameters and so forth within the scope of the present invention as recited in the appended claim.

TABLE 1

| Specimen No. | Alumina Ceramic Composition Ingredients [mol %] $Al_2O_3$ | CaO | $TiO_2$ | Adding Qty of $La_2O_3$ (wt. part) | Sintering Temperature (°C.) | Electrical Characteristic tan δ [× 10$^{-5}$] | Tf [ppm/°C.] | E | Average Gain Size (μ) | Relative Density (%) | Remarks |
|---|---|---|---|---|---|---|---|---|---|---|---|
| A-1 | 99.0 | 0.5 | 0.5 | 0 | 1380 | 15.8 | −20 | 10.0 | 6.1 | 97.2 | X |
| A-2 | 99.0 | 0.5 | 0.5 | 0.01 | 1380 | 15.6 | −20 | 10.0 | 5.0 | 97.7 | X |
| A-3 | 99.0 | 0.5 | 0.5 | 0.03 | 1380 | 6.4 | −20 | 10.0 | 4.0 | 98.0 | A |
| A-4 | 99.0 | 0.5 | 0.5 | 0.3 | 1390 | 4.0 | −23 | 10.0 | 2.9 | 98.5 | A |
| A-5 | 99.0 | 0.5 | 0.5 | 0.9 | 1410 | 4.4 | −26 | 10.1 | 3.1 | 98.3 | A |
| A-6 | 99.0 | 0.5 | 0.5 | 3.0 | 1440 | 5.6 | −30 | 10.3 | 3.9 | 98.0 | A |
| A-7 | 99.0 | 0.5 | 0.5 | 5.0 | 1470 | 10.0 | −36 | 10.4 | 4.4 | 97.6 | X |
| B-1 | 94.5 | 3.7 | 1.8 | 0 | 1380 | 14.5 | +5 | 11.7 | 8.7 | 96.9 | X |
| B-2 | 94.5 | 3.7 | 1.8 | 0.01 | 1380 | 14.4 | +5 | 11.7 | 6.3 | 97.2 | X |
| B-3 | 94.5 | 3.7 | 1.8 | 0.03 | 1390 | 5.9 | +4 | 11.7 | 5.0 | 97.9 | A |
| B-4 | 94.5 | 3.7 | 1.8 | 0.3 | 1400 | 4.3 | −1 | 11.7 | 4.3 | 98.4 | A |
| B-5 | 94.5 | 3.7 | 1.8 | 0.9 | 1410 | 4.8 | −7 | 11.8 | 4.8 | 98.2 | A |
| B-6 | 94.5 | 3.7 | 1.8 | 3.0 | 1440 | 5.8 | −13 | 11.9 | 5.4 | 98.0 | A |
| B-7 | 94.5 | 3.7 | 1.8 | 5.0 | 1460 | 8.9 | −20 | 12.0 | 6.1 | 97.5 | X |
| C-1 | 90.0 | 7.0 | 3.0 | 0 | 1370 | 14.4 | +30 | 13.0 | 8.2 | 96.7 | X |
| C-2 | 90.0 | 7.0 | 3.0 | 0.01 | 1370 | 14.4 | +30 | 13.0 | 7.4 | 97.0 | X |
| C-3 | 90.0 | 7.0 | 3.0 | 0.03 | 1380 | 5.9 | +28 | 13.0 | 6.1 | 97.4 | A |
| C-4 | 90.0 | 7.0 | 3.0 | 0.3 | 1400 | 3.7 | +22 | 13.0 | 4.8 | 98.0 | A |
| C-5 | 90.0 | 7.0 | 3.0 | 0.9 | 1410 | 4.6 | +13 | 13.1 | 5.1 | 97.8 | A |
| C-6 | 90.0 | 7.0 | 3.0 | 3.0 | 1430 | 5.8 | +4 | 13.2 | 6.0 | 97.3 | A |
| C-7 | 90.0 | 7.0 | 3.0 | 5.0 | 1450 | 9.2 | −8 | 13.3 | 7.4 | 97.1 | X |
| D-1 | 90.0 | 2.0 | 8.0 | 0 | 1360 | 12.7 | +31 | 13.4 | 9.4 | 96.6 | X |
| D-2 | 90.0 | 2.0 | 8.0 | 0.01 | 1360 | 12.6 | +32 | 13.4 | 8.8 | 96.9 | X |
| D-3 | 90.0 | 2.0 | 8.0 | 0.03 | 1370 | 6.0 | +29 | 13.4 | 6.6 | 97.5 | A |
| D-4 | 90.0 | 2.0 | 8.0 | 0.3 | 1380 | 4.0 | +27 | 13.4 | 4.0 | 98.3 | A |
| D-5 | 90.0 | 2.0 | 8.0 | 0.9 | 1380 | 4.8 | +23 | 13.5 | 4.6 | 98.1 | A |
| D-6 | 90.0 | 2.0 | 8.0 | 3.0 | 1400 | 5.8 | +18 | 13.6 | 6.6 | 97.8 | A |
| D-7 | 90.0 | 2.0 | 8.0 | 5.0 | 1420 | 8.6 | +14 | 13.7 | 8.0 | 97.0 | X |
| E-1 | 94.5 | 1.3 | 4.2 | 0 | 1370 | 12.8 | +6 | 11.8 | 9.6 | 97.0 | X |
| E-2 | 94.5 | 1.3 | 4.2 | 0.01 | 1370 | 12.6 | +6 | 11.8 | 8.9 | 97.3 | X |
| E-3 | 94.5 | 1.3 | 4.2 | 0.03 | 1370 | 5.8 | +4 | 11.8 | 5.5 | 97.8 | A |
| E-4 | 94.5 | 1.3 | 4.2 | 0.3 | 1380 | 4.1 | +2 | 11.8 | 3.9 | 98.5 | A |
| E-5 | 94.5 | 1.3 | 4.2 | 0.9 | 1390 | 4.9 | −1 | 11.9 | 4.8 | 98.3 | A |
| E-6 | 94.5 | 1.3 | 4.2 | 3.0 | 1410 | 5.9 | −5 | 12.0 | 6.2 | 97.9 | A |
| E-7 | 94.5 | 1.3 | 4.2 | 5.0 | 1430 | 8.9 | −10 | 12.1 | 8.4 | 97.4 | X |
| P-4 | 94.9 | 2.8 | 2.3 | 0.3 | 1390 | 3.1 | +3 | 11.5 | 2.1 | | A |
| Q-4 | 94.0 | 3.4 | 2.6 | 0.3 | 1400 | 3.7 | +2 | 11.6 | 2.8 | | A |
| R-4 | 94.0 | 2.2 | 3.8 | 0.3 | 1380 | 3.6 | +4 | 11.7 | 3.0 | | A |
| S-1 | 99.3 | 0.3 | 0.4 | 0.3 | 1400 | 5.7 | −33 | 9.8 | 5.0 | 97.7 | X |
| S-4 | 94.9 | 2.1 | 3.0 | 0.3 | 1380 | 2.9 | +1 | 11.6 | 2.4 | | A |
| T-1 | 94.5 | 4.1 | 1.4 | 0.3 | 1400 | 7.8 | −2 | 11.5 | 5.9 | 97.7 | X |
| U-1 | 94.5 | 2.5 | 3.0 | 0 | 1380 | 9.7 | +6 | 11.7 | 6.4 | 97.6 | X |
| U-2 | 94.5 | 2.5 | 3.0 | 0.01 | 1380 | 9.6 | +6 | 11.7 | 5.5 | 98.0 | X |
| U-3 | 94.5 | 2.5 | 3.0 | 0.03 | 1380 | 3.8 | +5 | 11.7 | 2.6 | 98.5 | A |
| U-4 | 94.5 | 2.5 | 3.0 | 0.3 | 1390 | 2.0 | +1 | 11.7 | 2.4 | 98.9 | A |
| U-5 | 94.5 | 2.5 | 3.0 | 0.9 | 1400 | 3.5 | −4 | 11.7 | 3.0 | 98.7 | A |
| U-6 | 94.5 | 2.5 | 3.0 | 3.0 | 1420 | 4.2 | −9 | 11.8 | 4.8 | 98.4 | A |
| U-7 | 94.5 | 2.5 | 3.0 | 5.0 | 1440 | 7.4 | +14 | 11.9 | 6.3 | 97.9 | X |
| V-1 | 94.5 | 0.9 | 4.6 | 0.3 | 1380 | 7.5 | +3 | 11.9 | 5.1 | 97.9 | X |
| W-1 | 90.0 | 4.5 | 5.5 | 0 | 1370 | 13.9 | +32 | 13.1 | 11.2 | 96.8 | X |
| W-2 | 90.0 | 4.5 | 5.5 | 0.01 | 1370 | 13.8 | +31 | 13.1 | 9.4 | 97.2 | X |
| W-3 | 90.0 | 4.5 | 5.5 | 0.03 | 1380 | 5.8 | +29 | 13.1 | 6.6 | 97.8 | A |
| W-4 | 90.0 | 4.5 | 5.5 | 0.3 | 1390 | 3.8 | +25 | 13.1 | 4.1 | 98.2 | A |
| W-5 | 90.0 | 4.5 | 5.5 | 0.9 | 1400 | 4.7 | +17 | 13.2 | 5.0 | 98.0 | A |
| W-6 | 90.0 | 4.5 | 5.5 | 3.0 | 1410 | 5.8 | +6 | 13.3 | 7.1 | 97.9 | A |
| W-7 | 90.0 | 4.5 | 5.5 | 5.0 | 1430 | 8.8 | +2 | 13.4 | 8.9 | 97.4 | X |
| X-1 | 89.5 | 8.0 | 2.5 | 0.3 | 1390 | 6.8 | +33 | 13.3 | 6.6 | 97.7 | X |
| Y-1 | 89.5 | 4.7 | 5.8 | 0.3 | 1380 | 6.2 | +32 | 13.4 | 5.9 | 97.9 | X |
| Z-1 | 89.5 | 1.5 | 9.0 | 0.3 | 1370 | 6.8 | +32 | 13.5 | 5.6 | 98.0 | X |

Note:
*The added quantity of $La_2O_3$ is shown in terms of a value with respect to 100 parts by weight of the blended composition.
A: within the inventive range
X: outside the inventive range

What is claimed is:
1. An alumina ceramic composition consisting essentially of:
(a) 100 parts by weight of a base composition consisting essentially of $Al_2O_3$, CaO and $TiO_2$ within their respective ranges as enclosed by rectilinear lines connecting points A-B-C-D-E-A, each having the undermentioned values in a ternary triangular coordinate system, wherein $Al_2O_3$, CaO and $TiO_2$ are represented, by three parameters in molar fraction on each of the three coordinates:

| | $Al_2O_3$ | CaO | $TiO_2$ | |
|---|---|---|---|---|
| A | 99.0 | 0.5 | 0.5 | |
| B | 94.5 | 3.7 | 1.8 | |
| C | 90.0 | 7.0 | 3.0 | |
| D | 90.0 | 2.0 | 8.0 | |
| E | 94.5 | 1.3 | 4.2 | ; and |

(b) 0.03 to 3 parts by weight of $La_2O_3$.

2. An alumina ceramic composition as defined in claim 1, wherein the proportions of $Al_2O_3$, CaO and $TiO_2$ are within the ranges defined by a line connecting the following points P-Q-R-S-P in molar fraction:

|   | $Al_2O_3$ | CaO | $TiO_2$ |
|---|-----------|-----|---------|
| P | 94.9 | 2.8 | 2.3 |
| Q | 94.0 | 3.4 | 2.6 |
| R | 94.0 | 2.2 | 3.8 |
| S | 94.9 | 2.1 | 3.0 |

3. A sintered alumina ceramic product obtained by sintering the alumina ceramic composition as defined in claim 1.

4. A sintered alumina ceramic product obtained by sintering the alumina ceramic composition as defined in claim 2.

* * * * *